United States Patent
Rome et al.

(10) Patent No.: US 12,407,220 B1
(45) Date of Patent: Sep. 2, 2025

(54) ELECTRICITY GENERATING BACKPACK WITH ADAPTIVE ELECTRONICS FOR WARMING BATTERIES IN COLD TEMPERATURES

(71) Applicant: Lightning Packs LLC, Strafford, PA (US)

(72) Inventors: Lawrence C. Rome, Strafford, PA (US); Sean H. McIntosh, Drexel Hill, PA (US); Heath F. Hofmann, Ann Arbor, MI (US)

(73) Assignee: Lightning Packs LLC, Strafford, PA (US)

( * ) Notice: Subject to any disclaimer, the term of this patent is extended or adjusted under 35 U.S.C. 154(b) by 0 days.

(21) Appl. No.: 18/606,752

(22) Filed: Mar. 15, 2024

Related U.S. Application Data

(60) Provisional application No. 63/456,824, filed on Apr. 4, 2023, provisional application No. 63/452,235, filed on Mar. 15, 2023.

(51) Int. Cl.
| | |
|---|---|
| *H02K 7/00* | (2006.01) |
| *H01M 10/42* | (2006.01) |
| *H01M 10/63* | (2014.01) |
| *H01M 50/247* | (2021.01) |
| *H02K 7/18* | (2006.01) |

(52) U.S. Cl.
CPC ........ *H02K 7/1861* (2013.01); *H01M 10/425* (2013.01); *H01M 10/63* (2015.04); *H01M 50/247* (2021.01); *H01M 2220/30* (2013.01)

(58) Field of Classification Search
CPC ... H02K 7/1861; A45F 3/08; A45F 2003/003; H01M 10/425; H01M 10/443; H01M 10/486; H01M 10/615; H01M 10/623; H01M 10/63; H01M 10/657; H01M 50/247; H01M 2220/30
See application file for complete search history.

(56) References Cited

U.S. PATENT DOCUMENTS

| | | | |
|---|---|---|---|
| 6,982,497 B2 | 1/2006 | Rome | |
| 7,391,123 B2 | 6/2008 | Rome | |
| 7,851,932 B2 | 12/2010 | Rome et al. | |
| 8,564,144 B1 * | 10/2013 | Rome | ....... A45F 4/02 290/1 C |
| 2009/0015022 A1 * | 1/2009 | Rome | ....... H02K 7/1853 290/1 A |
| 2020/0076016 A1 * | 3/2020 | Riemer | ....... H01M 50/121 |

* cited by examiner

*Primary Examiner* — Julio C. Gonzalez
(74) *Attorney, Agent, or Firm* — Michael P. Dunnam; CM Law PLLC

(57) ABSTRACT

An electricity generating backpack includes a generator that generates DC electricity for application to a load. The backpack includes an electronic control module (ECM) adapted to adjust an emulation resistance for the generator to maximize power output in response to a weight of the payload in the bag and an up and down movement of the bag in response to the walking or running cadence of the wearer of the backpack. The load may include a battery that stores DC electricity and a warming element in a warming pouch adapted to hold the battery. The warming element receiving DC electricity that is used to generate heat to warm the battery to maintain the battery within a desired temperature range for charging/discharging. When no load is connected, the DC electricity may be diverted to a power resistor to absorb power and to dissipate the power as heat.

24 Claims, 10 Drawing Sheets

ELECTRICITY GENERATING BACKPACK WITH ADAPTIVE ELECTRONICS FOR WARMING BATTERIES IN COLD TEMPERATURES

CROSS-REFERENCE TO RELATED APPLICATIONS

The present application claims priority under 35 U.S.C. § 119 (e) to U.S. Provisional Patent Application No. 63/452,235, filed Mar. 15, 2023, and to U.S. Provisional Patent Application No. 63/456,824, filed Apr. 4, 2023 the contents of which are incorporated herein by reference.

FIELD

This document pertains generally, but not by way of limitation, to an electricity generating backpack and, more particularly, to an energy generating backpack that is adaptive to warm a battery pouch to keep the battery in an optimal temperature range for energy density and charging and that is adapted to the motion of the wearer and weight carried for optimized power production.

BACKGROUND

Backpacks have been developed that harvest electrical energy during walking while minimizing shoulder strain on the wearer. Such backpacks are described, for example, in U.S. Pat. Nos. 6,982,497; 7,391,123; 7,851,932; and 8,564,144, the contents of which are incorporated herein by reference. The electricity generation in such backpacks relies upon an electronic control module (ECM) that converts the alternating current (AC) output from an electricity generator into a direct current (DC) output. The ECM also creates a constant emulation resistance for the generator. The constant emulation resistance is controlled by a fixed resistor on the ECM board that is set to adequately damp large excitations.

The electricity generator used in the above-referenced electricity generating backpacks generally does not lose power production capability in cold temperatures. In fact, its efficiency increases slightly. The generated electricity is stored in a battery pack contained within the backpack for use in off-the-grid charging of electrical devices. However, the battery packs in backpacks have the same problems as the batteries in electrical vehicles at low temperatures. Unfortunately, cold temperatures can significantly reduce the voltage and energy density of batteries, making them less effective. The batteries may lose a lot of charge or not work at all. It has also been found in practice that the batteries cannot charge if the batteries are too cold (e.g., less than −−−10° C.). Attempting to charge batteries in very cold temperatures (e.g., less than −20° C.) also can cause permanent damage. As a result, it is important to take precautions to protect the batteries from cold weather conditions and to explore alternative power sources for extended use.

SUMMARY

The present disclosure is directed to an electricity generating backpack having an electronic control module (ECM) with a microcontroller adapted to control the emulation resistance and to adjust the emulation resistance value to increase the power output for a given backpack payload weight and motion. The inherent nature of the electricity generating backpack design allows it to generate electricity even at very low temperatures (<−40° C.) without loss of power production capability, unlike conventional batteries. The electrical output may be used to warm a battery pouch to keep the battery within an optimal temperature range for power production and charging, even in cold temperatures, so the battery does not lose energy and also can be safely charged without damage. The electrical output also can be used to charge batteries or directly power electronic equipment such as radios, smart phones, or computers.

For example, a backpack is described herein that includes a generator that generates DC electricity for application to a load. The backpack includes an electronic control module (ECM) adapted to adjust an emulation resistance to maximize power output by the generator in response to a weight of the payload in the bag and an up and down movement of the bag in response to the walking or running cadence of the wearer of the backpack. The load may include a battery that stores DC electricity and a warming element in a warming pouch adapted to hold the battery. The warming element receiving DC electricity that is used to generate heat to warm the battery to maintain the battery within a desired temperature range for charging/discharging. When no load is connected, the DC electricity may be diverted to a power resistor to absorb power and to dissipate the power as heat.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1A:
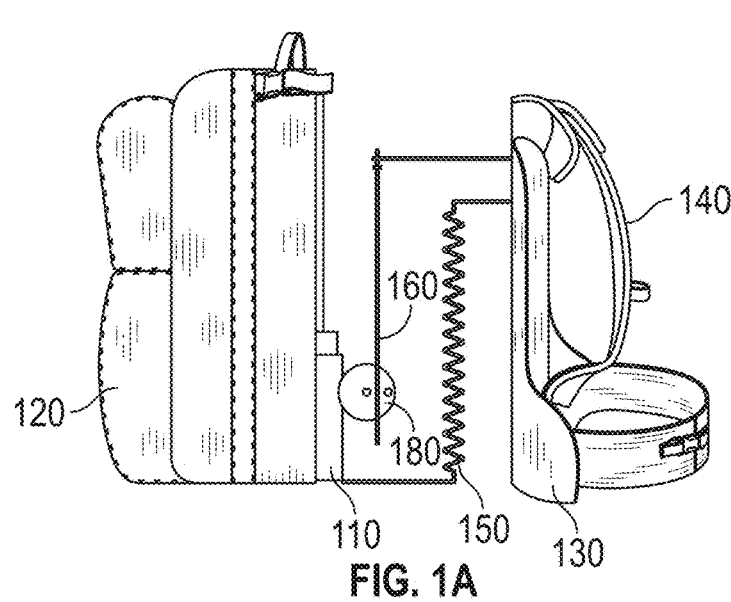
FIG. 1A illustrates an electricity generating backpack that is in an exploded view to illustrate the moving frame attached to a bag that is suspended from a fixed frame and attached to a harness via a spring in a sample configuration.

Reference now will be made in detail to embodiments, one or more example(s) of which are illustrated in the drawings. Each example is provided by way of explanation of the embodiments, not limitation of the present disclosure. It will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Operation of batteries at very low temperatures is a common problem, as illustrated in the winter of 2024. The batteries of EVs in the Midwest of the United States lost a lot of their energy because of the cold which stranded many motorists. Further, drivers were unable to charge their EVs because their batteries became too cold.

Similar but more severe problems face dismounted soldiers operating at very low temperatures as well as explorers on scientific missions. When batteries get below-20° C., much of the electrical energy is lost. At even colder temperatures, the batteries may not work at all. Worse still, there are no changing stations along the way. Hence, an electricity-generating backpack system is desired which is more efficient at cold temperatures so that some of the excess power can control the temperature of the battery, to optimize the power generated and permit charging of the battery at low outside temperatures. For instance, if the battery is too cold for charging (i.e. less than −20° C.) then all of the electricity generated by the backpack would go into warming the battery. After the battery temperature rises to at least 0-10° C., then charging the battery can commence.

Because some of the electricity generated by the pack must be used to warm the battery in very cold conditions, the power generated by the backpack should be maximized. The power output of the backpack is dependent on the load carried and the walking/running speed. In sample configurations, the damping is adjusted to maximize the electricity generated. A microcontroller system is used to measure the power being generated by the backpack and to adjust the damping coefficient/duty cycle to maximize power output. If a lowering of the damping coefficient/duty cycle increases power, then it is decreased again. If it is found that it decreases power, then the microcontroller increases the damping coefficient/duty cycle. Such configurations are described below with respect to FIGS. 1-11.

Figure 1B:
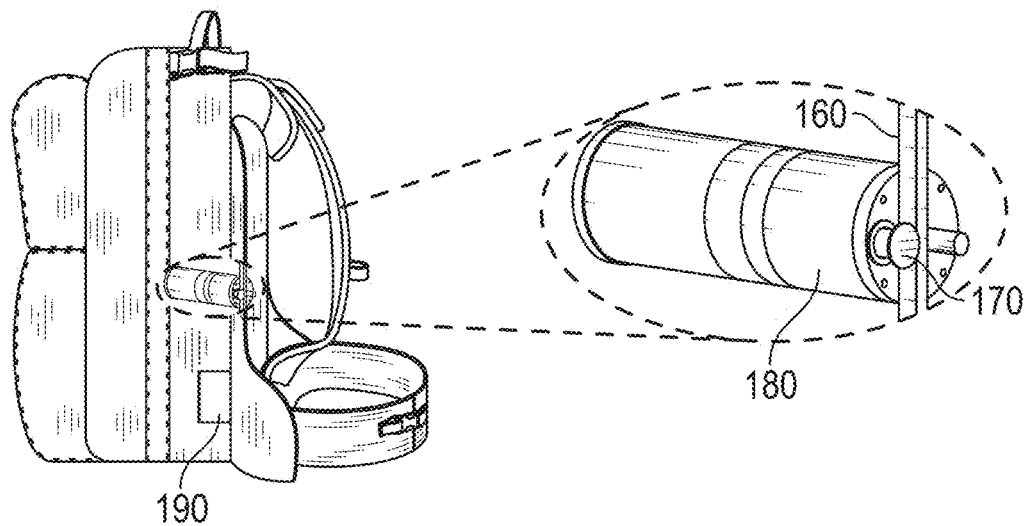
FIG. 1B illustrates the electricity generating backpack of FIG. 1A showing a rack attached to the fixed frame to spin a pinion attached to a generator on the moving frame that creates alternating current (AC) electricity when rotated that is provided to an Electronic Control Module (ECM) that converts the AC electricity into DC electricity in the sample configuration.

FIG. 1A illustrates a sample embodiment of an electricity generating backpack 100. The electricity generating backpack 100 described herein is particularly suited for off-the-grid applications where battery powered devices are being used and must be periodically charged. In FIG. 1A, the electricity generating backpack 100 is expanded to illustrate the moving frame 110 attached to a bag 120 that is suspended from a fixed frame 130 and attached to a harness 140 via a spring 150 in a sample configuration. A rack 160 is attached to the fixed frame 130 and is adapted to spin a pinion 170 (FIG. 1B) that is attached to a generator 180 on the moving frame 110 that is adapted to create AC electricity. As illustrated in FIG. 1B, the AC electricity generated by the generator 180 is provided to an Electronic Control Module (ECM) 190 that converts the AC electricity into DC electricity.

The ECM 190 converts the three phase AC output from the generator 180 into a DC output just as in the prior art electricity generating backpacks mentioned above. Power output from the ECM 190 is directed along an output cable 200 (FIG. 2) that is adapted to power DC electrical equipment or to charge batteries. If there is no load on the ECM 190, power is diverted to the power resistor 210 of the ECM 190 as a temporary load so that energy can be dissipated. The ECM 190 thus creates a constant emulation resistance for the generator 180.

In the prior art electricity generating backpacks mentioned above, a fixed emulation resistance was chosen that controlled the backpack at the most extreme excitation, large weight and fast walking speed; however, it was found by the present inventors that by adjusting the emulation resistance on the fly the backpack's output power could be optimized to the specific walking speed and payload weight. Accordingly, in the present configuration of the ECM 190, a microcontroller is added to the ECM 190 that executes instructions to control the emulation resistance to maximize the power output for a given backpack payload weight and walking/running cadence.

The inventors have found that when the damping coefficient is reduced at low speeds and low loads, there is a large increase in power output. To take advantage of this increase in power at low speeds and low loads, the electricity generating backpack 100 has been modified to include the ability to alter the damping coefficient manually between at least three set values in walking experiments and actuator experiments. The inventors found that at low speeds and/or low payloads the power increased more than 100% in many cases. Accordingly, the ECM 190 has been modified to include adaptive electronics that optimizes the damping coefficient (instead of taking a fixed value). As a result, even larger increases in power may be possible under low excitation conditions.

The adaptive electronics of the ECM 190 includes a microcontroller that executes instructions to adaptively adjust the emulated resistance, which determines the damping coefficient of the electronics (i.e., increasing emulation resistance decreases damping coefficient and vice-a-versa). The goal is to maximize the power generated for a given mechanical excitation level. This is achieved as follows.

The emulation resistance includes an adaptive component, $R_{adaptive}(t)$, plus a small oscillatory component; e.g.:

$$R(t) = R_{adaptive}(t) + R_{osc}(t).$$

The microcontroller of the ECM 190 will measure the output voltage and current of the electronics and calculate the output power Pout as a function of the emulated resistance. The oscillating portion of the resistance informs how the output power changes with the emulated resistance. This is captured in the partial derivative of the output power with respect to resistance, calculated as follows:

$$\frac{\partial P}{\partial R} = \frac{\frac{\partial P_{out}}{\partial t}}{\frac{\partial R_{osc}}{\partial t}}$$

The adaptive component of the emulated resistance will then be adjusted in the direction of increasing power as follows:

$$\frac{dR_{adaptive}}{dt} = K \frac{\partial P_{out}}{\partial R}$$

The result of these calculations is an emulation resistance (and hence damping coefficient) that moves about the optimal operating point, and hence maximizes the output power. The damping coefficient controls the movement of the backpack as the user walks.

The aforementioned prior art electricity generating backpacks, with their fixed damping coefficient, can be viewed as a "dumb" backpack which does not change its properties appropriately, whereas the electricity generating backpack described herein includes an adaptive damping coefficient that can be viewed as a "smart" backpack that measures the power output and changes the properties of the electricity generating backpack based on the load and the gait of the wearer. It should be noted that if the backpack were driven by an "unfeeling" mechanical device such as an actuator, then the electronics may come up with a large number of solutions which would not be comfortable and efficient for a human to wear. Hence, the smart electronics are adapted to solve for maximum power under the constraint of ergonomics. This may require using a more powerful microprocessor rather than a low power microcontroller to evaluate force and accelerometer measurements. The appropriate processor may be readily selected by those skilled in the art for use in different configurations.

In a sample configuration, the electronics of the ECM 190 includes a rectifier (92% efficiency) in series with DC: DC converter (91% efficiency) for an overall efficiency of about 83%. While the addition of a microcontroller (or microprocessor) may increase the power consumption by the electronics and hence reduce the efficiency of harvesting electronics of the ECM 190, this slight reduction in efficiency is insignificant compared to the potentially 100% increase in power entering the electronics (e.g., 82% of 20 W is much better than 83% of 10 W).

Furthermore, a synchronous rectifier may be used where the diodes of the existing three-phase rectifier are replaced with MOSFETs. The MOSFETs are controlled in such a way as to replicate standard three-phase AC-DC rectification, but with higher efficiency as the voltage drops across the MOSFETs will be lower than that of the diodes. This results in a significant increase in the efficiency of the synchronous rectifier, particularly in low-power conditions when the diode rectifier efficiency is poor.

The additional energy generated through use of an adaptive damping coefficient may further enable extra power to be used to create a means whereby power output of the electricity generating backpack 100 can be used to warm and charge a battery in cold temperatures. In such a configuration, the mechanical components of the electricity generating backpack 100 remain the same but the electronics are modified as follows.

Figure 2:
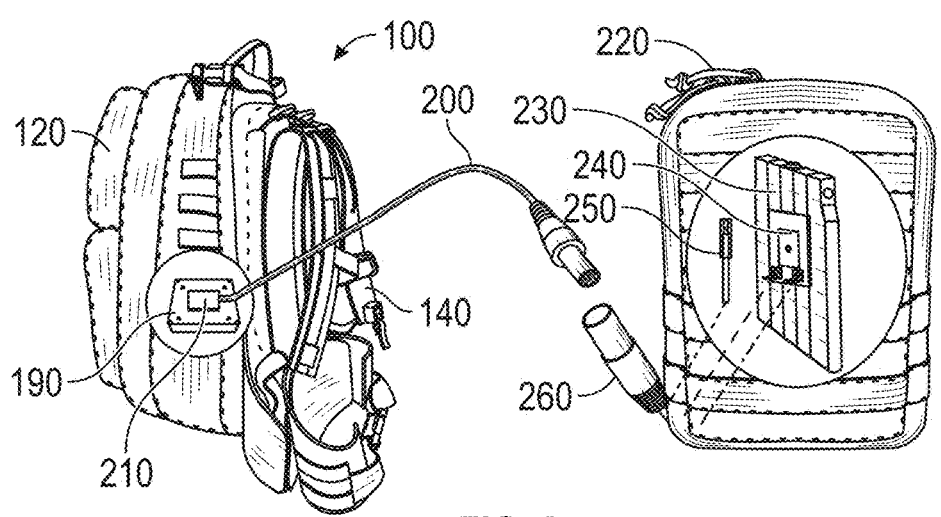
FIG. 2 illustrates the Electronic Control Module (ECM) and its connection to the battery warming pouch in the electricity generating backpack of FIG. 1A and FIG. 1B.

FIG. 2 illustrates the ECM 190 and its connection to the insulated battery warming pouch 220 adapted to store a battery 230 in the electricity generating backpack of FIG. 1. The ECM 190 converts the AC electricity from the generator 180 into DC electricity and ensures that the generator 180 sees a constant damping coefficient. The DC electricity from the ECM 190 is conveyed via cable 200 to the insulated battery warming pouch 220 including battery 230. A power resistor 240 in the battery warming pouch 220 is connected to the output cable 200 and generates heat to warm the battery 230. A thermistor/thermocouple 250 is also connected to the output cable 200 and is adapted to transmit information regarding the temperature of the battery 230. If the battery temperature hits a preset value, the ECM 190 will divert electricity from the power resistor 240 to another device that consumes/stores electricity (e.g., battery 230) or the power resistor 210 that resides on the ECM 190 for electricity dissipation.

In sample configurations, the ECM 190 converts the three phase AC output from the generator 180 into a DC output just as in the electricity generating backpack 100 described above with respect to FIG. 1A and FIG. 1B. Power output from the ECM 190 is directed along the cable 200, which can be used to power DC electrical equipment or charge batteries. However, in the configuration of FIG. 2, the power cable 200 is connected via a mating cable 260 to a heating element such as the power resistor 240 in the battery warming pouch 220. Electrical energy flowing through to the power resistor 240 generates heat that warms the battery warming pouch 220. The battery 230 is placed in the battery warming pouch 220 such that the power resistor 240 warms the battery 230 to its ideal temperature (usually around 10-22° C.) even when the ambient temperature is down to −40° C. The thermistor/thermocouple 250 is located in the battery warming pouch 220 to monitor the temperature inside the battery warming pouch 220. If the temperature inside the battery warming pouch 220, and hence the battery temperature, gets too high, the thermistor/thermocouple 250 sends a signal to the ECM 190 to divert electrical flow. The ECM 190 can then divert flow to other electrical components or to the power resistor 210 located on the ECM 190. The output electricity is diverted to the power resistor 210 as a temporary load so that energy can be dissipated. The ECM 190 also ensures that the generator 180 has a constant resistance creating a constant mechanical damping to the electricity generating backpack 100 as it moves up and down.

Figure 3:
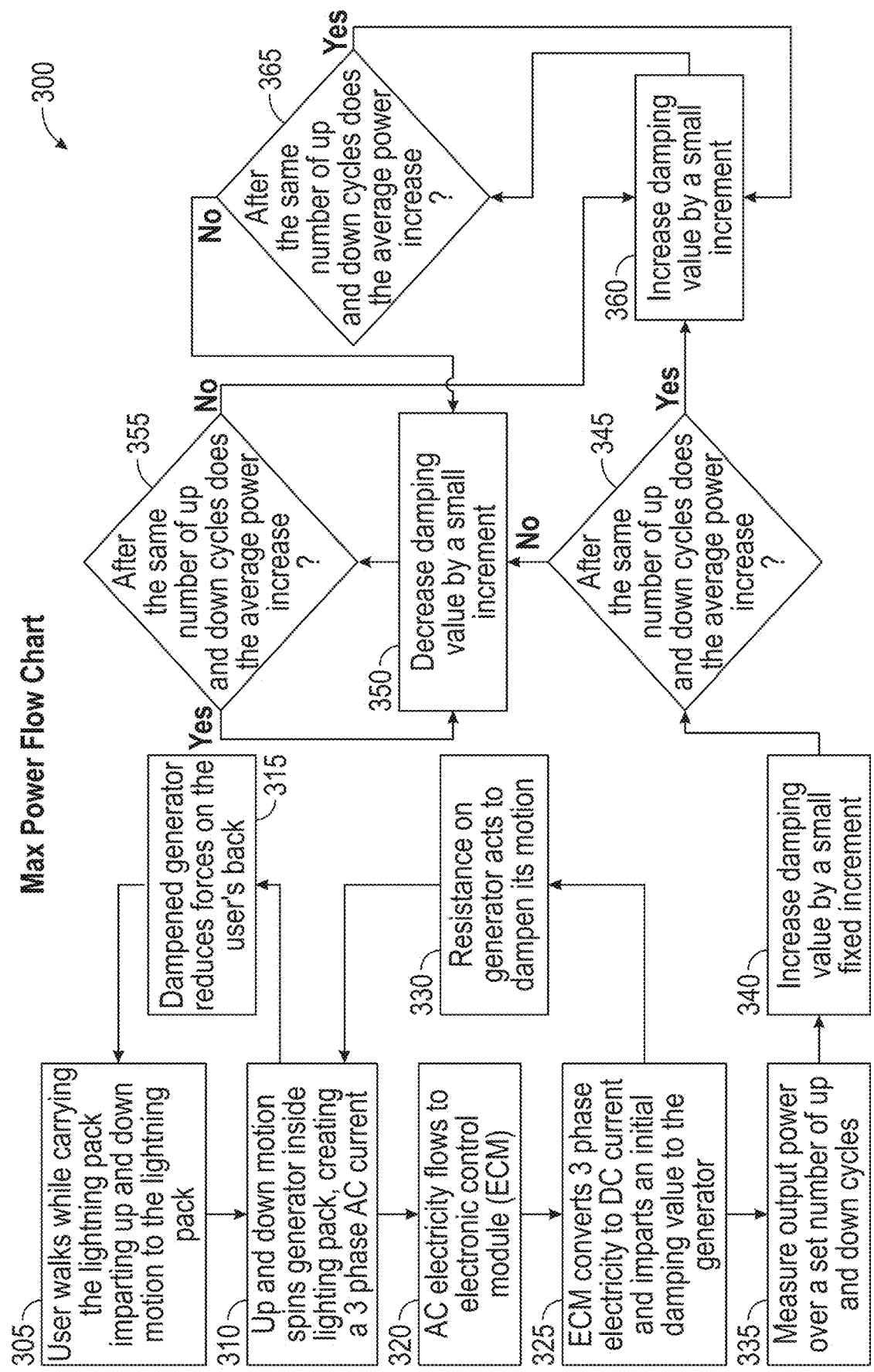
FIG. 3 illustrates a flow chart implemented by the microcontroller/CPU of the ECM for modifying the damping value to maximize power output in a sample configuration.

FIG. 3 illustrates a flow chart 300 implemented by the microcontroller/CPU 420 (FIG. 4) of the ECM 190 for modifying the damping value to maximize power output in a sample configuration.

Starting at 305, a user of the electricity generating backpack 100 walks or runs while wearing the electricity generating backpack 100. The user's motion imparts up and down motion to the electricity generating backpack 100. At 310, the up and down motions spins the generator 180 inside the electricity generating backpack 100 via the pinion 170 to create a 3 phase AC output. The dampened generator 180 reduces the forces on the user's back at 315.

The generated AC output flows to the ECM 190 at 320. At 325, the ECM 190 converts the 3 phase AC output to DC output and imparts an initial damping value to the generator 180. The resistance on the generator 180 acts to dampen its motion at 330.

At 335, the output power from the ECM 190 is measured over a set of up and down cycles of the electricity generating backpack 100.

At 340, the damping value is increased by a small, fixed increment. At 345, it is determined whether the average power increases after the same number of up and down cycles with the increased damping value.

If the average power does not increase with the increased damping value, the damping value is decreased at 350 by a small increment. At 355, it is determined whether the average power increases after the same number of up and down cycles with the decreased damping value.

If the average power increases at 355, the damping value is once again decreased at 350. This process continues so long as the average power increases at 355.

Once the average power no longer increases upon reduction of the damping value, the damping value is increased by a small increment at 360. Similarly, if is determined at 345 that the average power increases in response to an increase in the damping value, the damping value is increased by a small increment at 360.

At 365, it is determined whether the average power increases after the same number of up and down cycles with the increased damping value.

If the average power increases at 365, the damping value is once again increased at 360. This process continues so long as the average power increases at 365.

Once the average power no longer increases upon increase of the damping value, the damping value is increased by a small increment at 350 and the 350-355 loop is reentered.

It will be appreciated that the operation of steps 340-365 is to seek the optimal damping value to maximize the power output of the generator 180.

Figure 4:
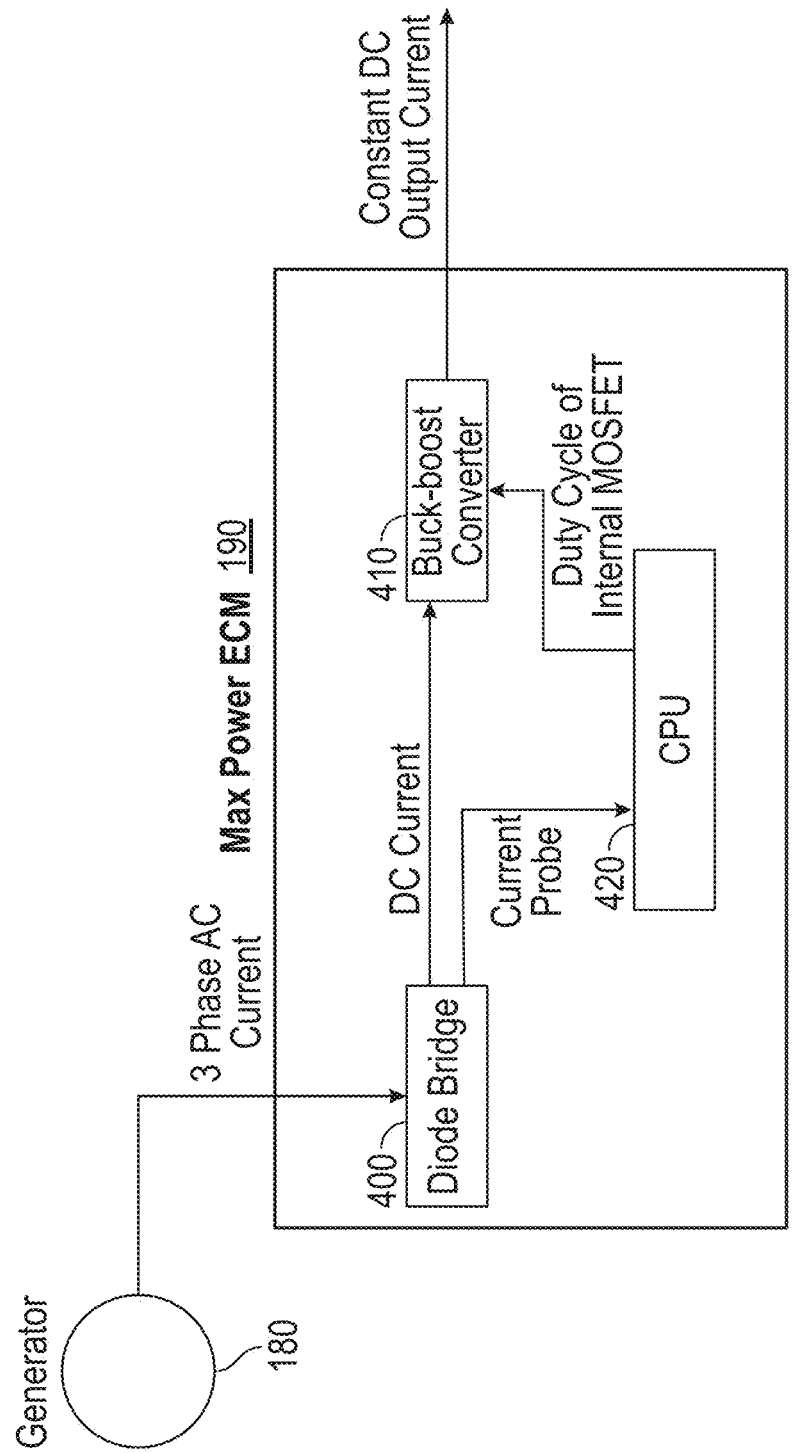
FIG. 4 illustrates a sample configuration of the ECM adapted to maximize power output by implementing the process flow of FIG. 3 in a sample configuration.

FIG. 4 illustrates a sample configuration of the ECM 190 adapted to maximize power output by implementing the process flow of FIG. 3 in a sample configuration. In the ECM 190 of FIG. 4, a 3 phase AC output is created by the spinning of the generator 180. The generator 180 spins, stops, and then reverses direction as the rack 160 moves up and down through its input gear. This 3 phase AC output passes into the ECM 190 where it is rectified by diode bridge 400 into a DC output that is applied to a buck-boost converter 410. A current probe measures the DC output and passes the measured value into the microcontroller/CPU 420. The microcontroller/CPU 420 measures the total power created each time the generator 180 starts and stops (which corresponds to each footstep). The buck-boost converter 410 steps the voltage up or down the desired output voltage of the battery 230. The emulation resistance of the ECM 190 is controlled through the set duty cycle of a MOSFET inside the Buck-boost converter 410. Based on the power measured by the current probe, the microcontroller/CPU 420 may adjust the duty cycle to increase the output power of the ECM 190.

Figure 5:
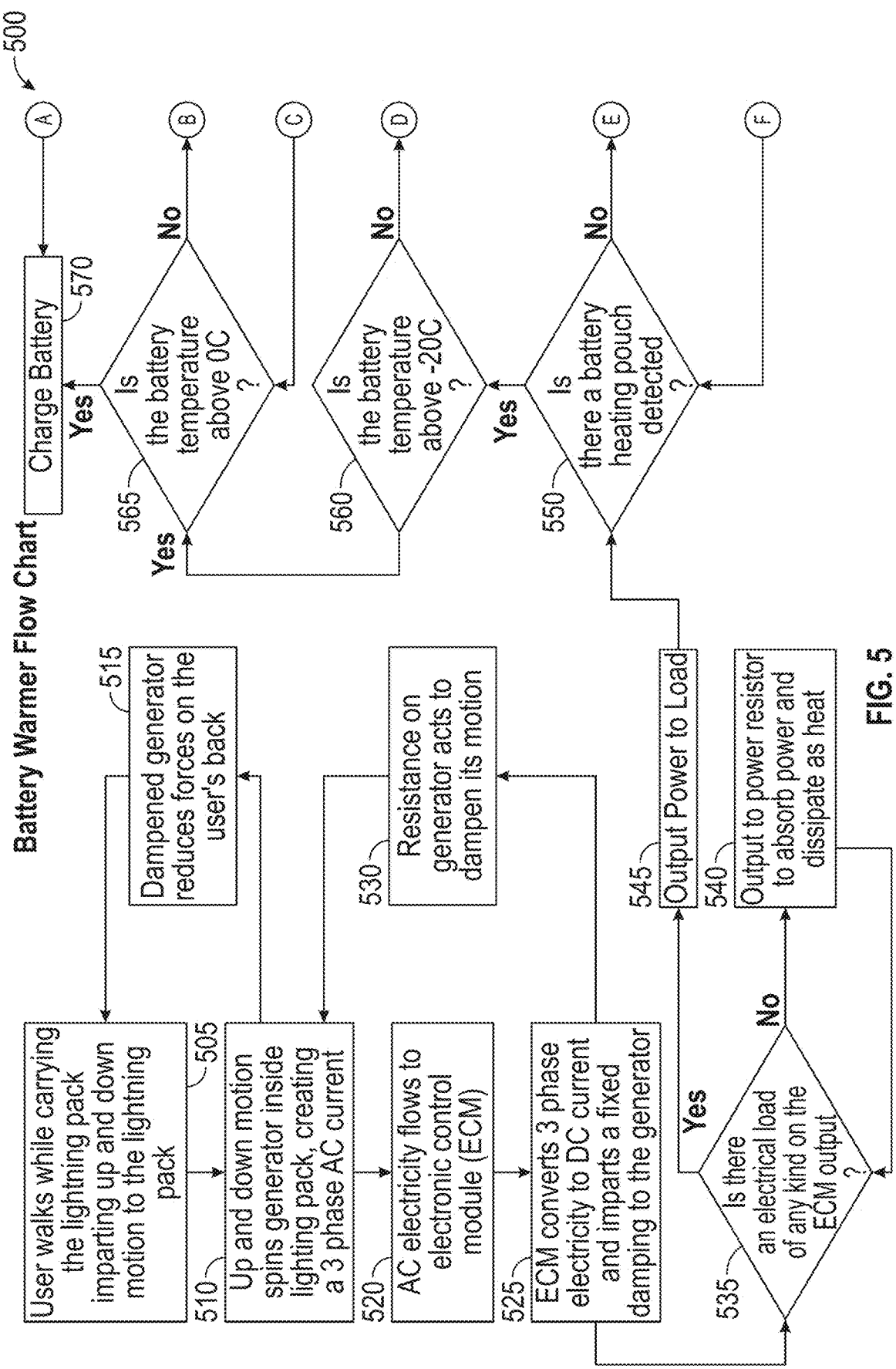
FIG. 5 illustrates a flow chart implemented by the microcontroller/CPU of the ECM for warming the battery in a sample configuration.
Figure 5:
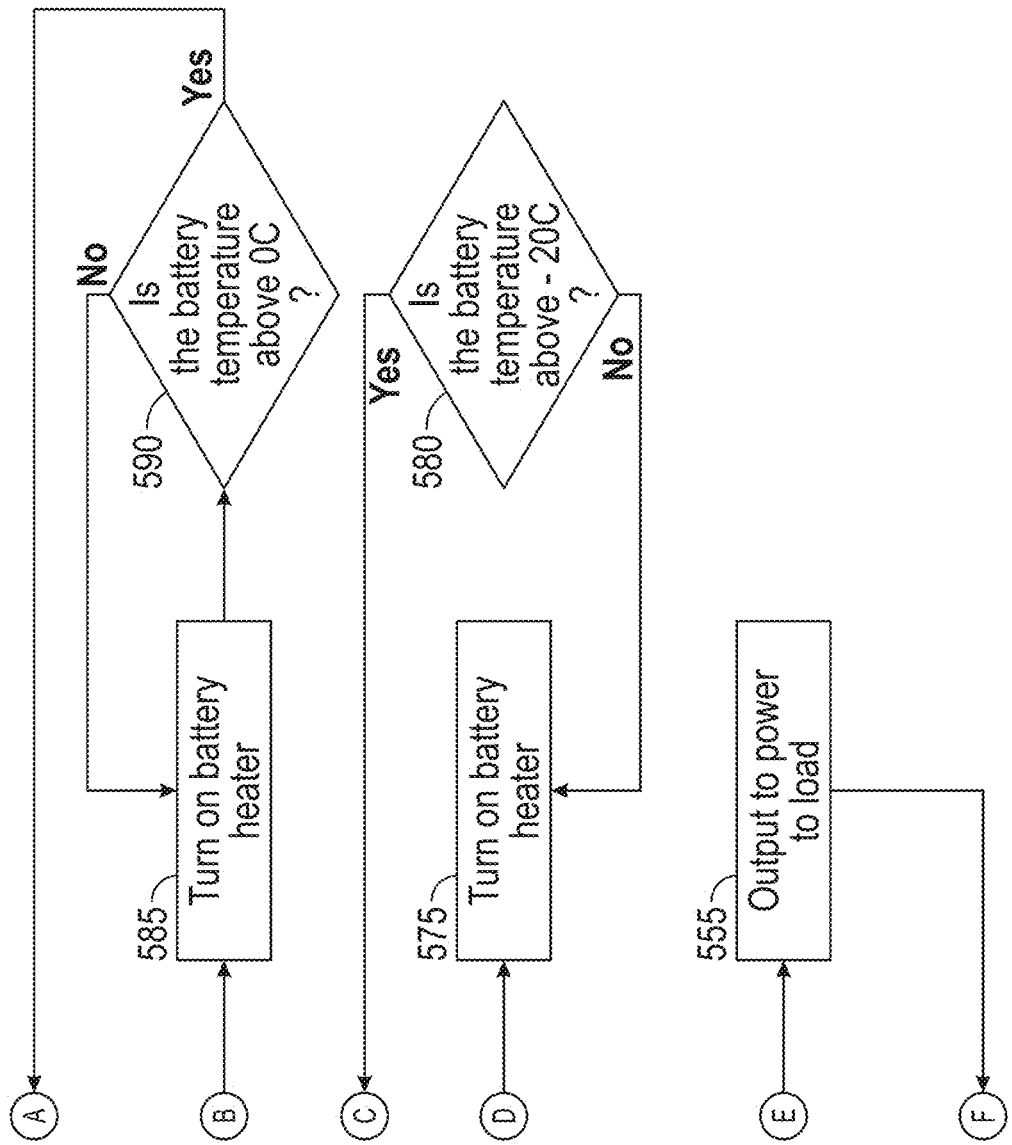

FIG. 5 illustrates a flow chart 500 implemented by the microcontroller/CPU 420 (FIG. 6) of the ECM 190' for warming the battery 230 in a sample configuration.

Starting at 505, a user of the electricity generating backpack 100 walks or runs while wearing the electricity generating backpack 100. The user's motion imparts up and down motion to the electricity generating backpack 100. At 510, the up and down motions spins the generator 180 inside the electricity generating backpack 100 via the pinion 170 to create a 3 phase AC output. The dampened generator 180 reduces the forces on the user's back at 515.

The generated AC output flows to the ECM 190' at 520. At 525, the ECM 190' converts the 3 phase AC output to DC output and imparts an initial damping value to the generator 180. The resistance on the generator 180 acts to dampen its motion at 530.

At 535, a determination is made as to whether there is an electrical load of any kind on the output of the ECM 190'. If no electrical load is detected at 535, the power output of the ECM 190' is provided to the power resistor 210 at 540 to absorb the power and to dissipate the power as heat.

However, if an electrical load is detected at 535, the power output is provided to the load at 545.

At 550, a determination is made as to whether a battery heating pouch 220 is detected. If no battery heating pouch 220 is detected at 550, all of the output of the ECM 190' is used to power the load at 555.

However, if a battery heating pouch 220 is detected at 550, the value of the thermistor 250 is read to determine at 560 whether the battery temperature is above a set point (e.g., −20° C.) and hence at a safe temperature for operation.

If it is determined at 560 that the battery temperature is above the set point for safe operation, it is determined at 565 whether the battery 230 is above a temperature (e.g., 0° C.) that is safe for charging the battery 230. If the temperature is at a temperature that is safe for charging the battery, the battery is charged at 570.

However, if the battery 230 is determined at 560 to be at a temperature that is too low for safe operation, the battery heater 240 is activated at 575. The battery heater 240 remains activated until it is determined at 580 from the value provided by thermistor 250 that the battery temperature is above a set point for normal operation (e.g., 20° C.).

Once the battery temperature is at the set point for normal operation, the control returns to 565 to determine whether the battery 230 may be charged. If the temperature of the battery 230 is above the set point for battery charging at 565, the battery 230 may be charged at 270. However, if the battery temperature is below the set point for battery charging at 565, the battery heater 240 is turned on and the battery 230 is charged at 270 so long as the temperature of the battery 230 remains above the set point for battery charging as determined at 590.

It will be appreciated that the operation of steps 535-590 is implemented to keep the battery temperature at a temperature suitable for charging and/or discharging without harming the battery 230.

Figure 6:
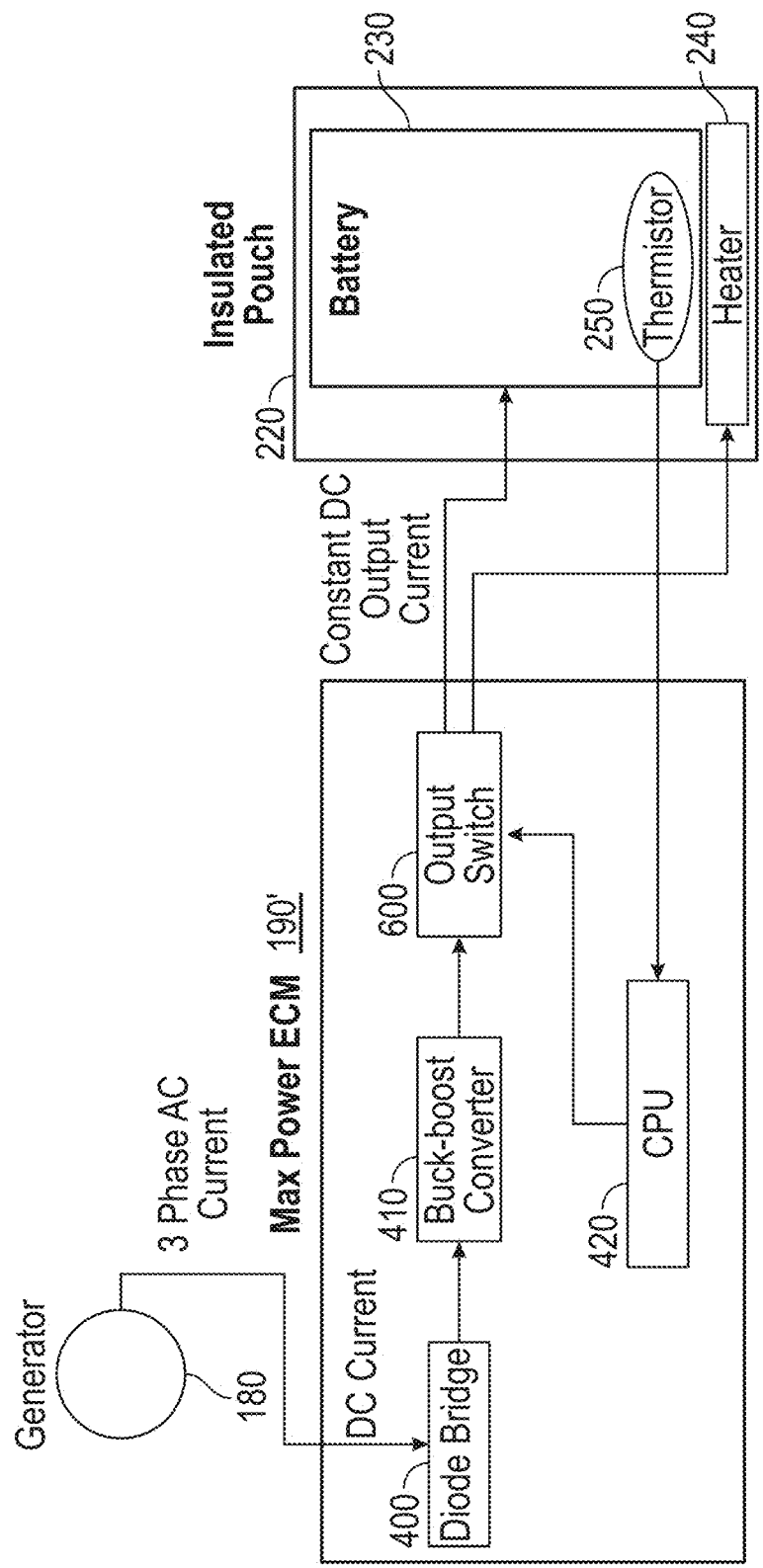
FIG. 6 illustrates a sample configuration of the ECM adapted to warm a battery by implementing the process flow of FIG. 5 in a sample configuration.

FIG. 6 illustrates a sample configuration of the ECM 190' adapted to warm a battery in a sample configuration. As with the ECM 190 illustrated in FIG. 4, a 3 phase AC output is created from the spinning of the generator 180. The generator 180 spins, stops, and then reverses direction as the rack 160 moves up and down through its input gear. This 3 phase AC output passes into the ECM 190' and is rectified into a DC output through the diode bridge 400. The buck-boost converter 410 steps up the voltage to match the needed voltage of the battery 230. A thermistor 250 measures the temperature of the battery 230 inside the battery warming pouch 220. If the temperature is below the set point for safe operation (e.g., −20° C.), a switch 600 in the ECM 190' controlled by the microcontroller/CPU 420 will send all of the output power to the heater 240 to warm the battery 230. If the thermistor 250 measures a temperature between set points, for example between −20° C. and 0° C., the output switch 600 may split the output power between the heater 240 and charging the battery 230. If the thermistor 250 reads a temperature above the upper limit (e.g., 0° C.), the output switch 600 may provide all power to the battery 230 for charging.

Figure 7:
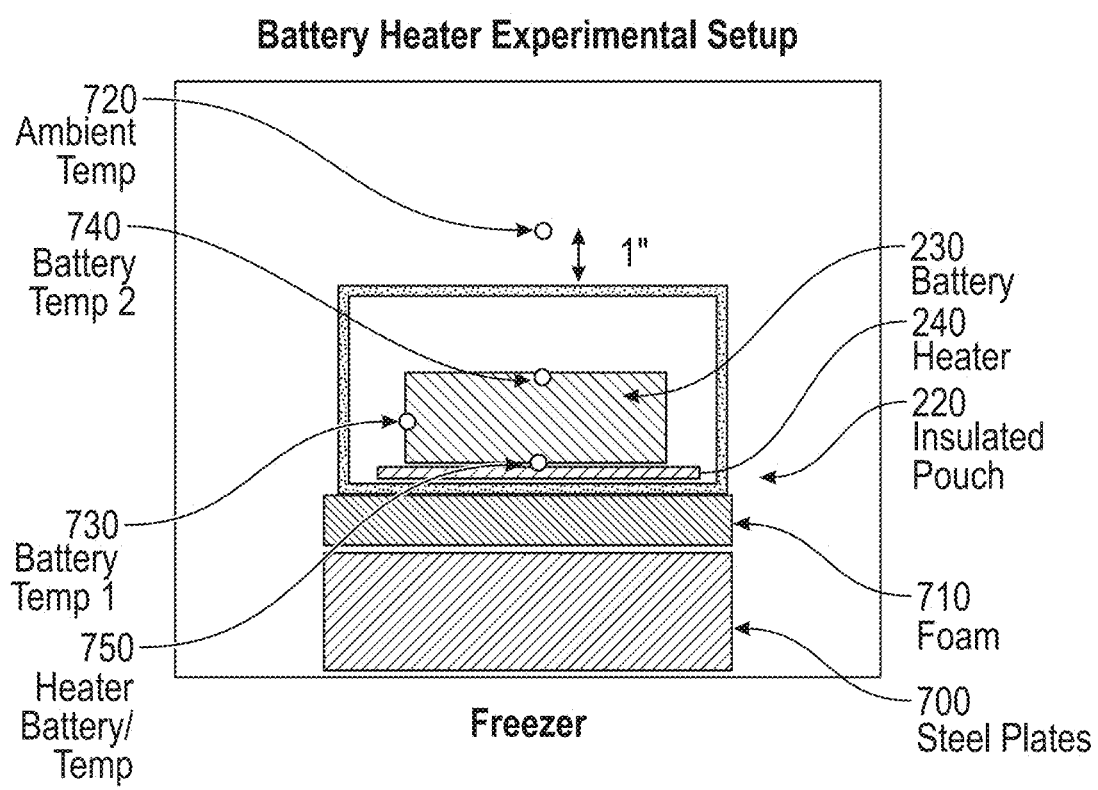
FIG. 7 illustrates a battery heater experimental setup used for testing the battery warmer of the sample configuration.

FIG. 7 illustrates a battery heater experimental setup used by the inventors for testing the battery warmer of the sample configuration. As illustrated, the battery 230 was placed on a heater 240 within an insulated battery warming pouch 220. The battery warming pouch 220 was placed on steel plates 700 that were separated from the battery warming pouch 220 by foam 710. The entire configuration was placed in a freezer. Sensors 720-750 were placed to respectively measure the ambient temperature in the freezer, a battery temperature on a lateral side of the battery 230, a battery temperature on the top of the battery 230, and a battery temperature at the interface with the heater 240. The results of the experiments are illustrated in FIGS. 8-11.

Figure 8:
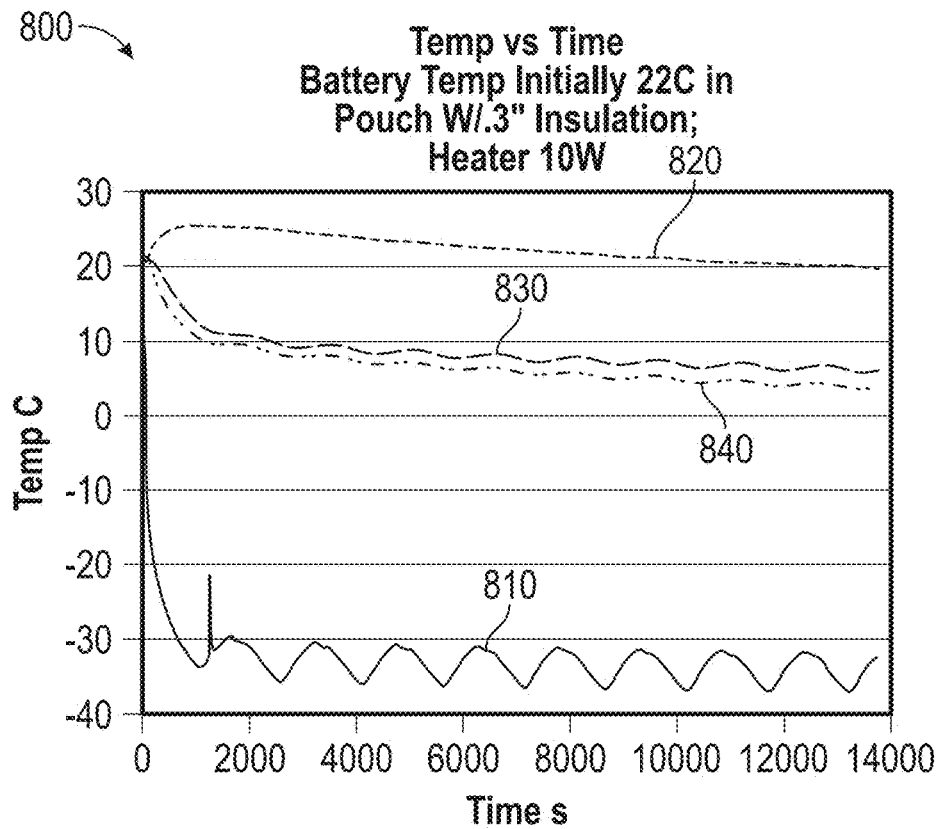
FIG. 8 is a graph illustrating the battery temperature inside a heated insulated pouch measured as the battery pouch is cooled inside a freezer using the battery heater experimental setup of FIG. 7.

FIG. 8 is a graph 800 illustrating the battery temperature inside the battery warming pouch 220 measured as the battery warming pouch 220 is cooled inside a freezer using the battery heater experimental setup of FIG. 7. Graph 800 shows the battery temperature inside the battery warming pouch 220 as the battery warming pouch 220 is cooled inside the freezer. Initially the entire system (battery 230 and battery warming pouch 220) was at 22° C. (room temperature and ideal battery temperature) inside a freezer at −35° C. (ambient temperature 810). The temperature read by sensor 750 is shown at 820; the temperature read by sensor 730 is shown at 830; and the temperature ready by sensor 740 is shown at 840. With 10 watts of power, the heater 240 inside the battery warming pouch 220 was found to be able to maintain a battery temperature of around 5° C. indefinitely.

Figure 9:
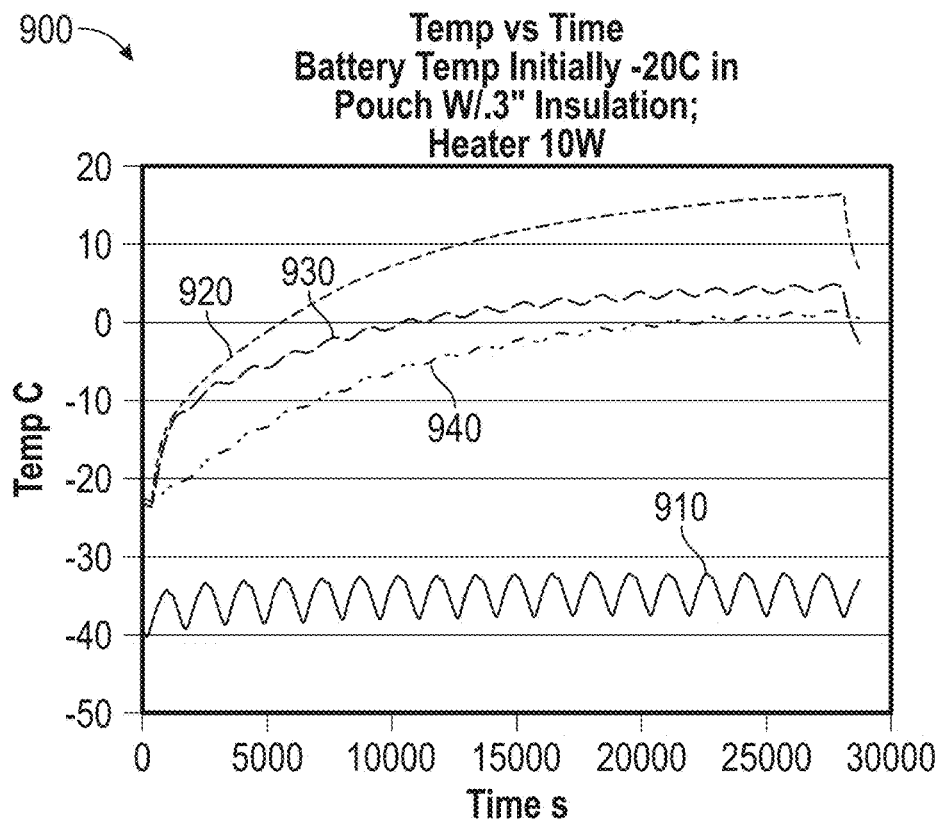
FIG. 9 is a graph illustrating the battery temperature inside a heated insulated pouch measured as the battery is heated using the battery heater experimental setup of FIG. 7.

FIG. 9 is a graph 900 illustrating the battery temperature inside the battery warming pouch 220 measured as the battery 230 is heated using the battery heater experimental setup of FIG. 7. Graph 900 shows the battery temperature inside the battery warming pouch 220 during heating by the heater 240. Initially, the entire system (battery 230 and battery warming pouch 220) was at −23° C. inside a freezer at −35° C. (ambient temperature 910). The temperature read by sensor 750 is shown at 920; the temperature read by sensor 730 is shown at 930; and the temperature ready by sensor 740 is shown at 940. As illustrated, it took approximately 333 minutes for the heater 240 to warm the battery up above 0° C.

It will be appreciated from FIG. 8 and FIG. 9 that the backpack 100 is much more effective in keeping a "warm" battery "warm" than warming up a very cold battery. It should be noted that starting with a "warm" battery is not unrealistic in the field. For military applications, if the user arrives in the field by parachute, then the battery will start off at a relatively "warm" temperature in the aircraft cabin. Further if the users spend a night in a tent, the battery/pouch which can be removed from the pack and placed in the relatively warm tent at 15° C. in subarctic conditions (or in a sleeping bag) will be much warmer than outside temperatures. It is noted that the data is for 10 W of power into the heater but that the heater can take up to 50 W of power. Thus, if the operator has access to a significant amount of power at the start, from a generator, vehicle, or some other source, the battery can be warmed up to 0° C.-20° C. and the battery can be kept at that temperature quite easily. Also, the insulation of the battery warming pouch 220 could be made thicker and thus require less power to stay warm.

It will be further appreciated that a higher temperature allows the battery to hold more energy (FIG. 8). This can be called "specific energy" but often is called "energy density". In addition, the higher temperature permits a higher voltage, and to the extent that the current through the load is dependent on voltage, it can also permit the battery to generate greater power.

Figure 10:
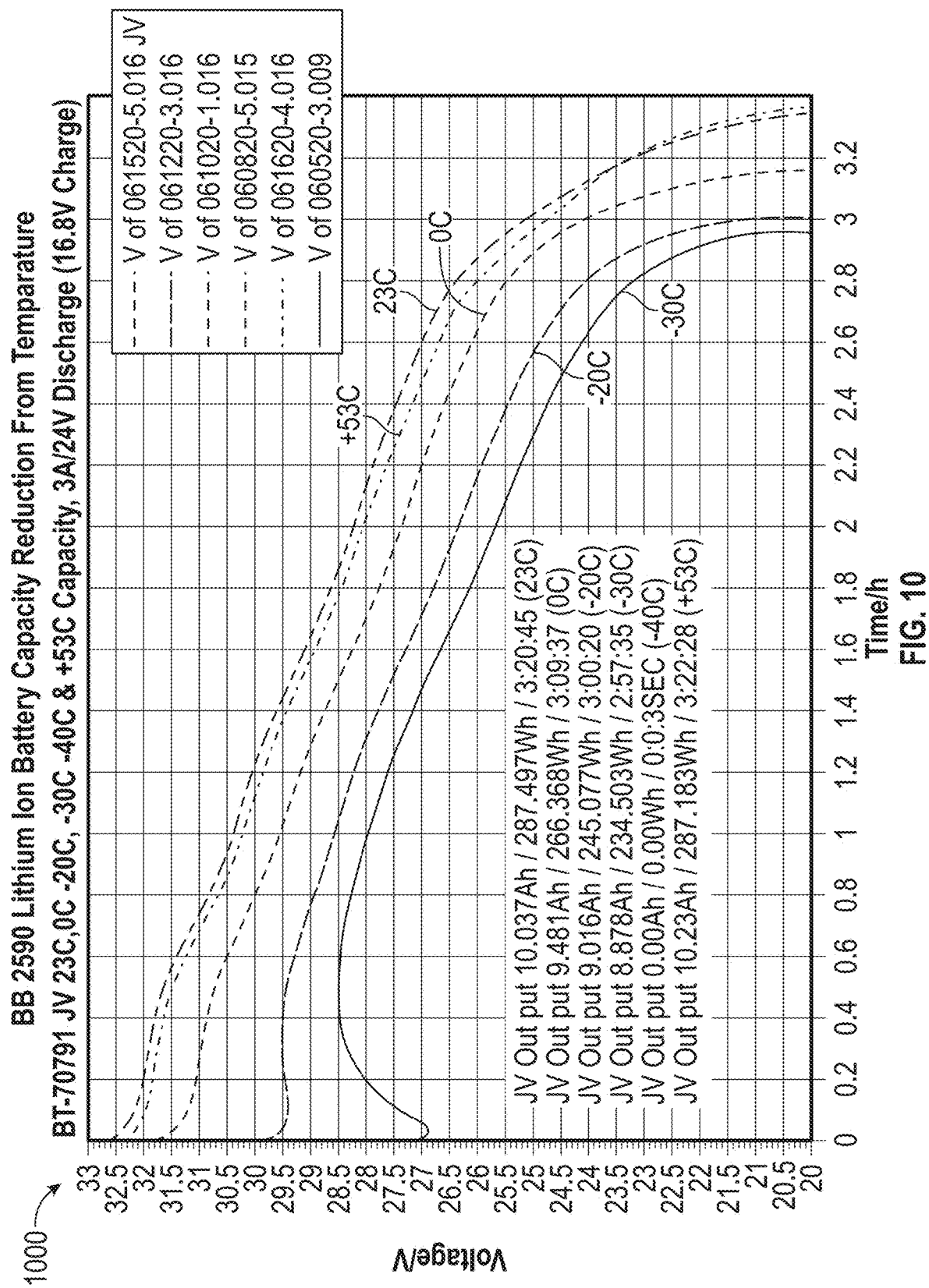
FIG. 10 is a graph illustrating the battery discharge at a constant 3 amps at different battery temperatures, measured by the battery manufacturer.

FIG. 10 is a graph 1000 illustrating the discharge of battery 230 at a constant 3 amps at different battery temperatures measured using the battery heater experimental setup of FIG. 7. Graph 1000 shows a BB2590 battery being discharged at a constant 3 amps at battery temperatures of 23° C., 53° C., 0° C., −20° C., and −30° C. Graph 1000 illustrates that, initially, the initial voltage of the battery 230 decreases significantly in cold temperatures. At 23° C., a fully charged battery has an initial voltage of nearly 33V and a battery at −30° C. has an initial voltage of 27V. At −40° C., the battery stopped working altogether. In addition to reduced initial voltage, graph 1000 illustrates that the total energy capacity of the battery 230 is reduced at cold temperatures. At 23° C., the BB2590 battery has an energy density of 287 Wh, while at −30 C the energy density was reduced to 234 Wh.

Figures 11A, 11B:
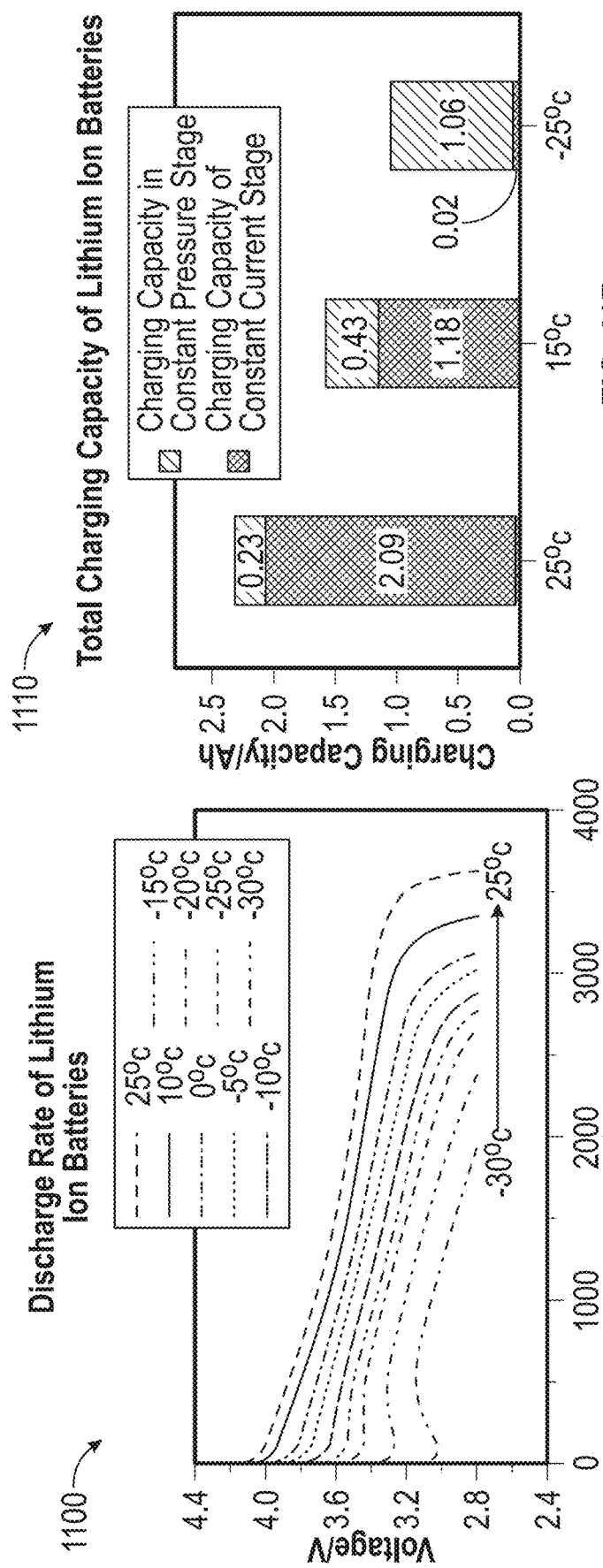
FIG. 11A is a graph illustrating the discharge rate of lithium ion batteries at different temperatures.
FIG. 11B is a graph illustrating the total discharging capacity of lithium ion batteries at different temperatures.

FIG. 11A is a graph 1100 illustrating the discharge rate of lithium ion batteries at different temperatures ranging from 25° C. to −30° C. Graph 1100 is a generic and normalized graph of voltage/discharge reduction of lithium ion batteries in cold temperatures.

FIG. 11B is a graph 1110 illustrating the total discharging capacity of lithium ion batteries at different temperatures ranging from 25° C. to −25° C. Graph 1110 shows the reduction in charging capacity of lithium ion batteries at low temperatures. When lithium ion batteries are charged, initially they are charged at a constant current and then switched to a constant voltage.

It will be appreciated that the ECM 190 and 190' may be implemented together as a common ECM where the microcontroller/CPU 420 implements the flow charts of FIG. 3 and FIG. 5. In an alternative configuration, the ECM 190 and ECM 190' described herein can be bypassed altogether and the AC output can directly power the fixed warming resistor 240 within the insulated warming pouch 220. In yet another configuration, a DC generator can be used to directly power the fixed warming resistor 240 within the insulated warming pouch 220.

Those skilled in the art will also appreciate that the techniques described herein may also be used to prevent water in a water bladder placed in the warming pouch 220 from freezing and/or also warming it up to a higher temperature for human consumption.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. An electricity generating backpack comprising:
a harness;
a fixed frame attached to the harness;
a bag;
a spring;
a moving frame attached to the bag and suspended from the fixed frame by the spring;
a pinion on the moving frame;
a rack attached to the fixed frame so as to spin the pinion upon up and down movement of the moving frame relative to the fixed frame;
a generator that generates alternating current (AC) electricity in response to spinning of the pinion by up and down movement of the moving frame relative to the fixed frame;
an electronic control module (ECM) that receives the AC electricity generated by the generator and converts the AC electricity to direct current (DC) electricity; and
an output cable that provides the DC electricity to a load, wherein the ECM adjusts, in response to a walking or running cadence of a wearer of the backpack, an emulation resistance on the fly to maximize power output generated in response to a payload weight in the bag and an up and down movement of the bag.

2. The backpack of claim 1, wherein the ECM adjusts the emulation resistance for the generator by reducing a damping coefficient at a low payload of the bag and a low walking or running cadence of the wearer.

3. The backpack of claim 1, wherein the ECM maximizes power output by the generator by optimizing a damping coefficient in accordance with a payload in the bag and a walking or running cadence of the wearer.

4. The backpack of claim 1, further comprising a power resistor connected to an output of the ECM to dissipate DC electricity when the load is unavailable or cannot dissipate the DC electricity.

5. The backpack of claim 1, wherein the ECM comprises a rectifier in series with a DC to DC converter and a processor that adaptively adjusts the emulation resistance by calculating an output power from an output voltage and current of the generator as a function of the emulation resistance and adjusting the emulation resistance in a direction that increases the output power.

6. The backpack of claim 5, wherein the rectifier comprises a synchronous rectifier comprising MOSFETs.

7. The backpack of claim 1, further comprising:
a battery that stores DC electricity received from the ECM via the output cable;
a warming pouch adapted to hold the battery; and
a warming element in the warming pouch that receives DC electricity from the ECM via the output cable and generates heat to warm the battery.

8. The backpack of claim 7, further comprising:
a temperature detector that detects a temperature in the warming pouch and provides the detected temperature to the ECM, wherein the ECM provides DC electricity to the warming element to maintain the battery within a desired temperature range.

9. The backpack of claim 8, wherein the ECM further comprises a switch connected to the warming element so as to divert, when the temperature detector detects that the temperature in the warming pouch is at a first preset temperature, DC electricity from the warming element to at least one of the load or a power resistor connected to an output of the ECM to dissipate DC electricity.

10. The backpack of claim 8, wherein the ECM determines whether the load is connected to an output of the ECM and provides output power to the load when the load is connected to the output of the ECM, and when no load is connected to the output of the ECM, the ECM diverts the DC electricity to a power resistor to absorb power and to dissipate the power as heat.

11. The backpack of claim 9, wherein when the temperature detector detects that the temperature in the warming pouch is at or above a second preset temperature that is greater than the first preset temperature, the ECM charges the battery with the DC electricity.

12. The backpack of claim 11, wherein when the temperature detector detects that the temperature in the warming pouch is below the second preset temperature, the ECM provides the DC electricity to the warming element.

13. The backpack of claim 7, further comprising a DC generator that provides DC electricity to the warming element.

14. A method of generating electricity using an electricity generating backpack adapted to generate direct current (DC) electricity from up and down movement of a payload in a bag of the electricity generating backpack as a result of a walking or running cadence of a wearer of the electricity generating backpack, the method comprising:
receiving, by an electronic control module (ECM), alternating current (AC) electricity generated by a generator of the electricity generating backpack and converting the AC electricity to DC electricity;
providing the DC electricity to a load; and
adjusting, by the ECM in response to the walking or running cadence of the wearer of the backpack, an emulation resistance on the fly for the generator to maximize power output generated in response to a weight of the payload in the bag and an up and down movement of the bag.

15. The method of claim 14, adjusting the emulation resistance for the generator comprises the ECM reducing a damping coefficient at a low payload of the bag and a low walking or running cadence of the wearer.

16. The method of claim 14, wherein adjusting the emulation resistance for the generator comprises the ECM maximizing power output by the generator by optimizing a damping coefficient in accordance with the payload in the bag and a walking or running cadence of the wearer.

17. The method of claim 14, further comprising dissipating DC electricity through a power resistor connected to an output of the ECM when the load is unavailable or cannot dissipate the DC electricity.

18. The method of claim 14, wherein adjusting the emulation resistance comprises the ECM adaptively adjusting the emulation resistance by calculating an output power from an output voltage and current of the generator as a function of the emulation resistance and adjusting the emulation resistance in a direction that increases the output power.

19. The method of claim 14, wherein the load includes a battery that stores DC electricity received from the ECM and a warming element in a warming pouch adapted to hold the battery, further comprising the warming element receiving DC electricity from the ECM and generating heat to warm the battery.

20. The method of claim 19, further comprising detecting a temperature in the warming pouch and providing the detected temperature to the ECM, and the ECM providing DC electricity to the warming element to maintain the battery within a desired temperature range.

21. The method of claim 20, wherein the ECM comprises a switch connected to the warming element so as to divert, when the temperature in the warming pouch is at a first preset temperature, DC electricity from the warming element to at least one of the load or a power resistor connected to an output of the ECM to dissipate DC electricity.

22. The method of claim 20, further comprising determining, by the ECM, whether the load is connected to an output of the ECM and providing output power to the load when the load is connected to the output of the ECM, and when no load is connected to the output of the ECM, diverting, by the ECM, the DC electricity to a power resistor to absorb power and to dissipate the power as heat.

23. The method of claim 21, further comprising charging the battery with DC electricity from the ECM when the temperature in the warming pouch is at or above a second preset temperature that is greater than the first preset temperature.

24. The method of claim 23, further comprising providing DC electricity to the warming element from the ECM when the temperature in the warming pouch is below the second preset temperature.

* * * * *